Nov. 2, 1943.  G. L. ROGERS  2,333,446
CURRENT RESPONSIVE CIRCUIT
Filed Sept. 30, 1941
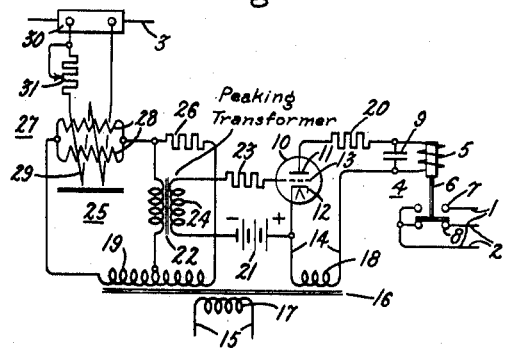
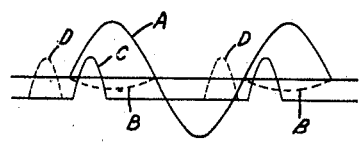
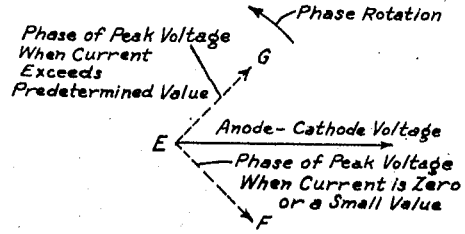
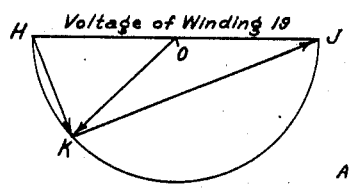
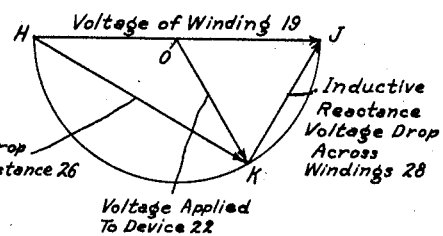
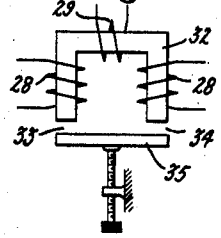
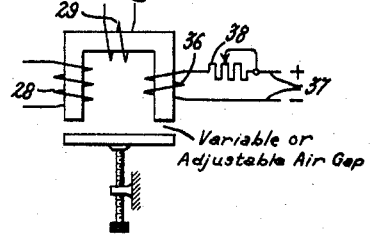
Inventor:
George L. Rogers,
by Harry E. Dunham
His Attorney.

Patented Nov. 2, 1943

2,333,446

UNITED STATES PATENT OFFICE 2,333,446

CURRENT RESPONSIVE CIRCUIT

George L. Rogers, Schenectady, N. Y., assignor to General Electric Company, a corporation of New York Application September 30, 1941, Serial No. 413,073

9 Claims. (Cl. 250—27)

My invention relates to electric control circuits and more particularly to electric circuits of the current responsive type in which a predetermined circuit controlling operation is performed in response to the current transmitted by an associated electric circuit.

It is frequently desirable in electric circuits to provide apparatus which performs a predetermined circuit controlling operation, such as the opening or closing of a circuit, in response to a predetermined electrical condition such as the current of an associated electric circuit and which operates rapidly and precisely in response to the magnitude of the current. Furthermore, it is highly desirable in most systems of this nature that the apparatus be susceptible of performing the circuit controlling operation without requiring frequent calibration and which maintains its accuracy without replacement of the essential components or parts.

It is an object of my invention to provide a new and improved electric control circuit.

It is another object of my invention to provide a new and improved current responsive circuit which performs a predetermined circuit controlling operation in response to a predetermined electrical condition of an associated circuit.

It is a further object of my invention to provide a new and improved circuit comprising an electric valve or electric discharge device which is rapidly and precisely controlled to perform a predetermined circuit controlling operation in response to the current of an associated electric circuit, and which is susceptible of performing frequent operations in rapid succession or at delayed intervals, depending upon the requirements of the particular application.

Briefly stated, in the illustrated embodiment of my invention I provide a new and improved current responsive circuit for performing a predetermined circuit controlling operation, such as the opening or closing of an associated control circuit, and which comprises an electric discharge device which is normally biased to one condition of conductivity, such as complete nonconduction or complete conduction, by means of a biasing voltage. The anode-cathode circuit of the electric discharge device is energized from a source of alternating current. I provide a phase shifting circuit for controlling the phase of the resultant voltage impressed on the grid or control member of the electric discharge device, and the phase of this resultant voltage is shifted in response to the current of an associated circuit to change abruptly the electric discharge device from a nonconductive condition to a conductive condition, or vice versa, when the current of the electric circuit attains a predetermined value or departs from a predetermined range of values.

For a better understanding of my invention, reference may be had to the following description taken in connection with the accompanying drawing, and its scope will be pointed out in the appended claims. Fig. 1 diagrammatically illustrates an embodiment of my invention as applied to a system for selectively energizing a plurality of electric circuits or control circuits, and Figs. 2-5, inclusive, represent certain operating characteristics thereof. Figs. 6 and 7 represent certain modifications of the variable impedance element which may be employed in the phase shifting circuit of the arrangement shown in Fig. 1.

Referring now to Fig. 1 of the drawing, my invention is there illustrated as applied to a system for performing a predetermined circuit controlling operation in connection with a single circuit, or a plurality of control or electric circuits 1 and 2 in response to the current of an associated electric circuit, such as a direct current circuit comprising a conductor 3. I provide a circuit controlling means, such as a relay 4, comprising an actuating coil 5 and an armature 6 which may be arranged to engage selectively contacts 7 and 8 to energize selectively the electric circuits 1 and 2. A capacitance 9 may be connected across the actuating coil 5 to maintain the flow of current through the actuating coil 5 substantially constant even though, as will be explained hereinafter, only pulsating unidirectional current is transmitted to the actuating coil 5.

I provide an electric valve or electric discharge device 10 which energizes the actuating coil 5 in response to predetermined conditions of the direct current circuit. The electric discharge device 10 is preferably of the type employing an ionizable medium, such as a gas or a vapor, and includes an anode 11, a cathode 12 and a grid or control member 13. The anode-cathode circuit of electric discharge device 10 is energized from a source of alternating current 14 which may be obtained from an alternating current circuit 15 by means of a transformer 16 comprising a primary winding 17 and secondary windings 18 and 19. The anode-cathode circuit of discharge device 10 is connected in series relation with winding 18 and actuating coil 5 through current limiting resistance 20.

Means are provided for maintaining the electric discharge device 10 in a predetermined state or condition of conductivity. In the particular arrangement illustrated, I employ a biasing potential, such as a unidirectional biasing potential furnished by a battery 21, for impressing on the control member 13 a voltage which is sufficient to render the discharge device 10 nonconducting so long as the periodic voltage, described hereinafter, does not occur in the region of the positive half cycles of applied anode-cathode voltage.

A peaking transformer or device 22 of the saturable inductive type is provided to impress on the control member 13 a periodic or alternating voltage of peaked wave form which overcomes the effect of the biasing voltage produced by battery 21 when a positive impulse of peaked voltage occurs within the region of the positive half cycles of applied anode-cathode voltage. Current limiting resistance 23 is connected in series relation with battery 21 and secondary winding 24 of the peaking transformer 22.

In order to change abruptly the condition of the conductivity of electric discharge device 10, as for example to change the electric discharge device 10 from a completely conducting condition to a nonconducting condition, I provide a phase shifting circuit 25 which is also energized by alternating current and includes a pair of electric circuits or branches, both of which are energized from the secondary winding 19 of transformer 16, and one of which includes a resistance 26 and the other of which includes a variable impedance element such as a saturable inductive device 27. The saturable inductive device 27 may comprise a magnetically saturable core member and a pair of windings 28 connected in one of the branches and includes means, such as a control winding 29, for controlling the impedance or inductive reactance of the windings 28. Control winding 29 is energized in response to the current conducted by conductor 3 and may be connected to conductor 3 through a shunt 30 and a current controlling or adjusting resistance 31.

The operation of the embodiment of my invention illustrated in Fig. 1 will be explained by considering the system when it is arranged to effect deenergization of the actuating coil 5 of relay 4 when the current conducted by conductor 3 attains a predetermined value. Phase shifting circuit 25 is arranged so that the phase of the resultant voltage impressed on control member 13 of electric discharge device 10 is within the region of the positive half cycles of applied anode-cathode voltage so long as the current in conductor 3 remains below a predetermined value. Consequently, the electric discharge device 10 conducts unidirectional current through winding 5 by virtue of the voltage supplied thereto by secondary winding 18 of transformer 16. The capacitance 9 serves to obtain a substantially uniform flow of unidirectional current through the actuating coil 5. Under this condition, it will be appreciated, of course, that contacts 7 in circuit 1 will be closed and contacts 8 in circuit 2 will be open.

If it be assumed that the current in conductor 3 increases, the resultant increase of current in control winding 29 of saturable inductive device 27 increases the magnetization of this device and as the saturation point is approached, the phase of the periodic voltage of peaked wave form produced by peaking transformer 22 is advanced to the region of the negative half cycles of applied anode-cathode voltage so that electric discharge device 10 is abruptly rendered nonconducting. As a result, actuating coil 5 of relay 4 is deenergized thereby controlling circuits 1 and 2, by opening contacts 7 and closing contacts 8. If the current of circuit 3 decreases, the reverse operation will take place; that is, the magnetization of the device 27 will be decreased effecting a retardation in phase of the periodic voltage of peaked wave form to the region of the positive half cycles of voltage applied to discharge device 10, causing this device to conduct current and consequently effecting energization of actuating coil 5.

Figs. 2-5, inclusive, may be considered in order to explain more fully the operating characteristics of the circuit shown in Fig. 1. Curve A represents the anode-cathode voltage applied to discharge device 10, and curves B represent the critical control characteristics of discharge device 10, that is, the minimum voltage which must be impressed on control member 13 in order to render the discharge device conducting. The output voltage of peaked wave form produced by peaking transformer 22 as displaced by the negative biasing potential is represented by curve C, and the dotted curves D represent the same voltage when it is advanced in response to the current of the conductor 3. So long as the current of conductor 3 remains below a predetermined value, the peaks of voltage as represented by curve C remain in the region of the positive half cycles of anode-cathode voltage, and upon saturation of device 27 are advanced to the region of the negative half cycles. It will be noted that the phase of the voltage of peaked wave form impressed on grid 13 is advanced and that the electric discharge device 10 is abruptly changed from a substantially full-on condition to a completely nonconducting condition. Fig. 3 represents the vector diagram of the voltage of the same relationships represented in Fig. 2. Vector EF represents the phase of the voltage of peaked wave form which is impressed on control member 13 when the current in conductor 3 is zero or of a small value. It will be noted that vector EF lags the anode-cathode voltage, and that consequently the electric valve is conducting when this condition exists. The vector EG represents the phase of the voltage of peaked wave form when the current of conductor 3 exceeds a predetermined value, causing an advancement in phase of the voltage within the region of the negative half cycles of anode-cathode voltage so that the electric discharge device 10 is rendered nonconducting. It will be appreciated that some liberty has been taken in representing the periodic voltages C and D of Fig. 2 by rotating vectors. However, this representation serves to illustrate the relation of the voltage peaks with respect to the zero point of the anode-cathode voltage.

Fig. 4 represents the relationship of the voltages of the phase shifting network or circuit 25 for the condition when the current of conductor 3 is below the predetermined value. It will be noted that the vector OK, which represents the voltage applied to device 22, lags the voltage of winding 19 by a substantial angle, causing the output voltage of the peaking device 22 to have the phase relationship of the vector EF in Fig. 3. Fig. 5 represents the relationship among the voltages of the phase shifting circuit 25 for the condition which prevails when the current of conductor 3 exceeds the predetermined value. It will be observed that vector OK has been advanced in phase and that the output voltage of peaking transformer 22 has been correspondingly advanced in phase to the position corresponding to vector EG of Fig. 3. The variation in phase of the voltage supplied to the peaking transformer 22, as represented by vector OK, is due to the variation in the inductive reactance voltage drop appearing across windings 28 of saturable inductive device 27. This voltage is represented by vectors JK in Figs. 4 and 5. The phase of the voltage supplied to the peaking device 22, of course, is determined by the vector OK which lies in the locus established by the semi-circle inasmuch as the resistance voltage drop and the reactance voltage drop are always at right angles.

The value of current at which the phase shift is sufficient to change the electric discharge device 10 from conduction to nonconduction may be adjusted by means of the resistance 31. As the magnitude of this resistance is decreased, the discharge device 10 is rendered nonconducting at smaller critical values of current transmitted through conductor 3. It will be readily appreciated that other arrangements may be employed for the calibration or adjustment of the phase shifting circuit 25.

Fig. 6 illustrates one construction of the core member of the saturable inductive device 27 which I may employ in order to adjust the phase shifting circuit 25 to cause a rapid shift in phase at a predetermined value of current flowing in conductor 3. The windings 28 are wound around the core structure 32, and the core structure is provided with an air gap, or air gaps, 33 and 34 the length of which may be determined by an adjustable member or section 35. As the length of the air gaps is increased, the device saturates at higher values of current of conductor 3 and will consequently cause a rapid shift in phase at higher values of current.

Fig. 7 represents a still further arrangement for controlling the value of current at which the shift in phase occurs. The inductive device is provided with an additional control winding 36 which is energized with direct current from a suitable source of current 37 through a current controlling or adjusting resistance 38. The magnitude of the current flowing through control winding 36 establishes the value of current at which the discharge device 10 is rendered nonconducting. As the magnitude of current supplied to winding 36 is increased in value, it will be appreciated that the critical value at which this phase shift occurs is reduced and, conversely, as the current supplied to winding 36 is decreased the critical value is increased.

Although in the illustrated embodiment of my invention I have shown the system as arranged for maintaining the electric discharge device 10 conducting so long as the current of the associated circuit remains below a predetermined value and in which the discharge device is rendered nonconducting when the current exceeds the predetermined value or attains the predetermined value, it will be appreciated, in view of the above disclosure, that the system may be arranged to operate in the reverse manner. That is, the system may be arranged so that the electric discharge device 10 is maintained nonconducting when the current of the associated circuit remains below a predetermined value, and is rendered conducting only when the current attains or exceeds the predetermined value. This latter type of operation may be effected by the design of the phase shifting circuit 25 to produce a retardation in phase of the voltage of peaked wave form produced by device 22 from the positive half cycles of applied anode-cathode voltage to the negative half cycles when the current attains or exceeds the predetermined value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a circuit to be controlled, means for controlling the energization of said circuit and comprising a source of alternating current and an electric discharge device having an anode, a cathode and a control member, the anode-cathode circuit of said electric discharge device being connected in circuit with said source, means for impressing a voltage on said control member tending to render said discharge device nonconducting, a second electric circuit, means for controlling the resultant voltage impressed on said control member comprising means for producing a periodic voltage, and phase shifting means energized in response to the current of said second electric circuit for advancing the phase of said periodic voltage from a substantially full-on phase control position to a completely non-conducting phase control position when the current of said second electric circuit exceeds a predetermined value thereby rendering said electric discharge device nonconducting.

2. In combination, a circuit to be controlled, means for controlling the energization of said circuit and comprising a source of alternating current and an electric discharge device having an anode, a cathode and a control member, the anode-cathode circuit of said electric discharge device being connected in circuit with said source, means for impressing on said control member a voltage tending to render said electric discharge device nonconducting, a second electric circuit, a peaking device for impressing on said control member a periodic voltage of peaked wave form, and phase shifting means connected between said second electric circuit and said peaking device for maintaining the phase of said peaked voltage within the positive half cycles of applied anode-cathode voltage of said discharge device so long as the current of said second electric circuit is below a predetermined value and for advancing the phase of said peaked voltage within the region of the negative half cycles of applied anode-cathode voltage when the current of said second electric circuit attains a predetermined value.

3. In combination, a circuit to be controlled, means for controlling the energization of said circuit and comprising a source of alternating current and an electric discharge device having an anode, a cathode and a control member, the anode-cathode circuit of said electric discharge device being connected in circuit with said source, means for impressing on said control member a voltage tending to render said electric discharge device nonconducting, a second electric circuit, a peaking device for impressing on said control member a periodic voltage of peaked wave form, and phase shifting means connected between said second electric circuit and said peaking device for controlling the phase of said periodic voltage and including a variable impedance element and means for controlling the impedance of said element to maintain the periodic voltage impressed on said control member within the positive half cycles of applied anode-cathode voltage so long as the current of said second electric circuit is below a predetermined value and for advancing the phase of said periodic voltage within the region of the negative half cycles of applied anode-cathode voltage when the current of said second electric circuit attains a predetermined value.

4. In combination, an electric circuit to be controlled, means for controlling the energization of said circuit and comprising a source of alternating current and an electric discharge device having an anode, a cathode and a control member, the anode-cathode circuit of said electric discharge device being connected in circuit with said source, means for impressing on said control member a voltage tending to render said electric discharge device nonconducting, a second electric circuit, a peaking device for impressing on said control member a periodic voltage of peaked wave form, and phase shifting means connected between said second electric circuit and said peaking device and comprising a saturable inductive device for controlling the phase of the periodic voltage impressed on said control member, said peaking device comprising a control winding energized in response to the current transmitted by said second electric circuit so that said periodic voltage lies within the region of the positive half cycles of anode-cathode voltage applied to said electric discharge device so long as the current of said second electric circuit remains below a predetermined value and for advancing the periodic voltage within the region of the negative half cycles of applied anode-cathode voltage when the current of said second electric circuit attains a predetermined value.

5. In combination, electric translating device, an electric discharge device having an anode-cathode circuit connected to energize said device and having a control member, an electric circuit, means for impressing on said control member a bias voltage tending to render said electric discharge device nonconducting, a saturable peaking device for producing a periodic voltage of peaked wave form, and means for energizing said peaking device in response to the current of said electric circuit and including a phase shifting circuit comprising a variable impedance element and means for controlling the impedance of said element in response to the current of said electric circuit to advance the phase of said peaked voltage from a substantially fully conducting phase control position to a completely nonconducting phase control position when the current attains a predetermined value.

6. In combination, electric translating device, an electric discharge device having an anode-cathode circuit connected to energize said device and having a control member, means for impressing on said control member a bias potential tending to render said discharge device nonconducting, a source of alternating current connected to said coil and said anode-cathode circuit, a peaking device for impressing on said control member a periodic voltage of peaked wave form, an electric circuit, and phase shifting means connected between said electric circuit and said peaking device for controlling said peaking device to maintain the phase of said voltage of peaked wave form within the region of the positive half cycles of applied anode-cathode voltage and for advancing the phase within the region of the negative half cycles of applied anode-cathode voltage in response to the current of said electric circuit.

7. In combination, a circuit to be controlled, means for controlling the energization of said circuit and comprising a source of alternating current and an electric discharge device having an anode, a cathode and a control member, the anode-cathode circuit of the electric valve means being connected in circuit with said source, means for impressing a voltage on said control member tending to render said discharge device nonconducting, a second electric circuit, means for controlling the resultant voltage impressed on said control member comprising means for producing a periodic voltage, phase shifting means energized in response to the current of said second electric circuit for advancing said periodic voltage rapidly and substantially less than 180° when the current of said second circuit attains a predetermined value thereby rendering said electric discharge device completely nonconducting and comprising a saturable inductive device, and means for controlling the magnetization of said inductive device to control the value of current of said second electric circuit at which the abrupt shift in phase occurs.

8. In combination, a circuit to be controlled, means for controlling the energization of said circuit and comprising a source of alternating current and an electric discharge device having an anode, a cathode and a control member, means for impressing a voltage on said control member tending to render said discharge device nonconducting, a second electric circuit, means for controlling the resultant voltage impressed on said control member comprising means for producing a periodic voltage, and phase shifting means connected between said source and the last mentioned means and responsive to the current of said second electric circuit for advancing rapidly the phase of said periodic voltage from a substantially full-on control position to a completely nonconducting phase-control position when the current of said second circuit attains a predetermined value.

9. In combination, a circuit to be controlled, means for controlling the energization of said circuit and comprising a source of alternating current and an electric discharge device having an anode, a cathode and a control member, means for impressing a voltage on said control member tending to render said discharge device nonconducting, a second electric circuit, means for controlling the resultant voltage impressed on said control member comprising means for producing a periodic voltage, and phase shifting means connected between said source and the last mentioned means and comprising a saturable inductive device including a winding energized in response to the current of said second electric circuit for advancing rapidly said periodic voltage from a substantially full-on phase control position to a completely nonconducting phase control position.

GEORGE L. ROGERS.